Sept. 24, 1957  L. PERAS  2,807,249
TWO-STROKE ENGINE HAVING TWO OPPOSED CYLINDERS
Filed Nov. 2, 1954

United States Patent Office 2,807,249
Patented Sept. 24, 1957

2,807,249
TWO-STROKE ENGINE HAVING TWO OPPOSED CYLINDERS

Lucien Péras, Billancourt, France, assignor to Regie Nationale des Usines Renault, Billancourt, France, a company of France Application November 2, 1954, Serial No. 466,419

Claims priority, application France November 20, 1953

3 Claims. (Cl. 123—56)

It is known that among small-capacity engines for motor vehicles four-stroke engines having two opposed cylinders have excellent balance of inertia forces. The two big ends of the connecting rods are attached to two throws on the crankshaft disposed at 180° to one another, and thus symmetrical. The two pistons thus move symmetrically, and their inertia forces cancel at any given moment.

The driving forces are regularly spaced in the cycle, since when the two pistons simultaneously approach the centre, one is carrying out the expansion stroke, and the other the inlet stroke.

If two opposed pistons are fitted in the same way in a two-stroke engine, the same balance is achieved, but there is not the benefit of a couple which is more regular than that of a single-cylinder engine, since the two pistons carry out the expansion stroke simultaneously. On the other hand, if the two connecting rods are connected to the same crankpin, the two pistons will not move symmetrically, but substantially equipollently. The couple becomes more regular, since, one of the pistons is carrying out the expansion stroke and the other the compression stroke, but balance is entirely destroyed because the inertia forces of the moving parts are additive instead of cancelling each other.

The object of the invention is to construct a two-stroke engine with opposed cylinders having a couple as regular as that of a four-cylinder four-stroke engine, for example.

It is known that, on the axis of the cylinders, the primary inertia forces of an engine with pistons attached to the same crankpin may be considered as a projection on this axis of the inertia forces produced by the alternately moving masses considered as concentrated on the crankpin. It is consequently possible entirely to balance these forces along this axis by a suitable counterweight opposed to this crankpin.

The invention relates to a two-stroke engine having opposed cylinders, in which the connecting rods are attached to a common crankpin, the latter comprising balancing masses allowing the primary inertia forces on the axis of the cylinders to be completely cancelled.

However, in the perpendicular axis, the counterweight sets up a new series of alternating inertia forces of the same intensity as that which has been suppressed on the axis of the cylinders.

In order to cancel these inertia forces in this new axis, the invention makes use of the conventional procedure, which consists in causing two masses which are equal and symmetrical in relation to this axis to turn in opposite directions; the value of these masses is such that the sum of the inertia forces along the axis under consideration is equal and opposite at any given moment to the inertia forces to be compensated.

Consequently, the invention also aims at a two-stroke engine having opposed cylinders of the type already described, in which the inertia forces set up by the balancing masses of the crankshaft along an axis perpendicular to the axis of the cylinders are compensated by a dynamic balancing device consisting of two shafts parallel to the crankshaft, turning in opposite directions to one another at the same speed as the latter, and each carrying eccentric masses substantially symmetrical in relation to this axis.

In accordance with a particular characteristic of the invention, the scavenging compressor of the engine is used as the dynamic balancing device thus described. The scavenging compressor is in fact of the gearwheel type, and provides precisely the conditions of two rotors turning in opposite directions at the same speed.

Naturally, this speed will be made equal to the speed of the crankshaft, and the unbalance of the rotors will be effected chiefly by not lightening the vanes which have been chosen as masses.

The invention will now be described by way of example, with reference to the attached drawing, wherein.

Figure 1:
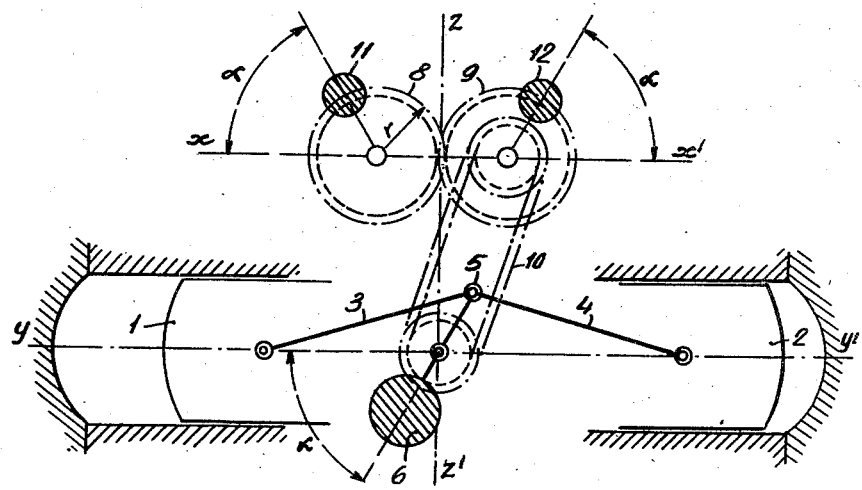
Figure 1 is an explanatory diagram of the engine and its balancing system.

With reference to the drawings, it will be seen that the pistons 1 and 2 are coupled by the connecting rods 3 and 4 to the crankpin 5. The mass 6 is opposed to the crankpin 5 in conventional manner. The mass 7 shown in Figure 2 comprises first of all the mass necessary for balancing centrifugal forces plus the mass 6 as has just been described.

The mass 6 balances the alternating inertia forces on the axis $y$—$y'$. It sets up along the axis $z$—$z'$ a series of alternating forces of the same period and the same intensity.

The scavenging compressor is disposed on the axis $z$—$z'$ above the engine and delivers air to the cylinder inlet ports as shown. In Figure 1, the two driving gears of this compressor are shown at 8 and 9, and also the drive at crankshaft speed by the synchronised transmission 10. The masses 11 and 12 are equal, and disposed at a distance $r$ from their centre of rotation, and are both disposed at an angle $\alpha$ to the axis $x$—$x'$, equal to the angle of the counter weight 6 to the axis $y$—$y'$. It is apparent that at any given moment the inertia forces on the axis $x$—$x'$ are cancelled, and that on the axis $z$—$z'$ the inertia forces of these two masses 11 and 12 can entirely balance the inertia force of the mass 6, provided a suitable value is given to the masses 11 and 12.

It is naturally difficult to provide two symmetrical masses 11 and 12 in a gearwheel compressor with a small number of teeth. By way of example, in Figure 2, the mass 11 is shown disposed in one of the vanes of a three-vaned rotor, the other two vanes being hollowed out. On the other hand, the other rotor has two loaded vanes and one hollowed-out vane.

Figure 2:
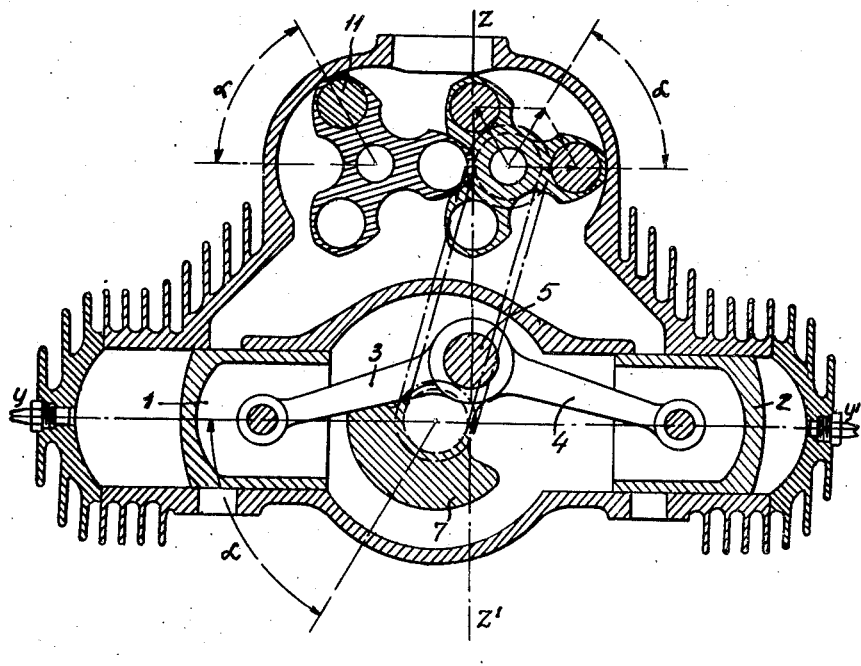
Figure 2 is a transverse section of an example of an engine constructed in accordance with this principle.

It can easily be verified in the right-hand rotor in Figure 2 that the resultant of the two masses, each equal to the mass 11, has the same effect as the mass 12 shown in Figure 1.

The engine shown can have any type of scavenging. It is shown as air-cooled, but it is obvious that cooling could be by means of an intermediate liquid.

It will be noted that the arrangement of the three-vaned compressor allows a very wide delivery aperture to be provided, which is well adapted to the flat-twin arrangement.

The invention is naturally not limited to the embodiment described, but, on the contrary, comprises all variants.

I claim:

1. A two-cycle engine having opposed cylinders provided with inlet parts, pistons in said cylinders, a central crank shaft, connecting rods connecting the pistons to a common crank pin, counter-balancing means connected to the crank shaft for eliminating unbalance of masses along a first plane containing the axes of the opposed cylinders and an improved rotary compressor adapted to eliminate unbalance of masses in a second plane through the crank shaft and perpendicular to the axes of the cylinders comprising a dynamic counter-balance, said compressor comprising two interdigitated rotors having axes of rotations disposed close together on the same side as the first plane and located one on each side of the second plane, said axes of rotation lying in planes substantially parallel to the crankshaft, each of said compressor rotors having the same odd number of blades, at least one first blade of one rotor and the two second blades of the other rotor which recurrently engage both sides of the first blade being heavier than the other blades of the rotor, means for driving the rotors in opposite directions at the same speed as the crankshaft, means rigidly connecting the compressor and the engine, said compressor being provided with a discharge outlet communicating with the cylinder inlet ports.

2. An engine according to claim 1, in which each rotor has three vanes.

3. A two-cycle engine having opposed cylinders provided with inlet parts, pistons in said cylinders, a central crankshaft, connecting rods connecting the pistons to a common crank pin, counter-balancing means connected to the crankshaft for eliminating unbalance of masses along a first plane containing the axes of the opposed cylinders, and a dynamic counter-balance for eliminating unbalance of masses in a second plane through the crankshaft and perpendicular to the axes of the cylinders, said dynamic counter-balance comprising a scavening compressor having two shafts located parallel to the crankshaft, means for rotating the two shafts in opposite directions at the same speed as the crankshaft, said shafts being located close together on the same side of the first plane and one on each side of the second plane, said shafts carrying interdigitated compressor rotors each having the same odd number of blades, at least one first blade of one rotor and the two second blades of the other rotor which recurrently engage both sides of the first blade being heavier than the other blades of the rotor, said compressor being provided with a housing connected to said engine and providing a compressor discharge outlet communicating with the cylinder inlet parts.

References Cited in the file of this patent

UNITED STATES PATENTS

| | | |
|---|---|---|
| 1,163,832 | Lanchester | Dec. 14, 1915 |
| 1,259,391 | Gildersleeve | Mar. 12, 1918 |
| 1,472,012 | Leblanc | Oct. 23, 1923 |
| 1,861,380 | Brewer | May 31, 1932 |
| 1,898,459 | Newcomb | Feb. 21, 1933 |
| 2,013,163 | Meyer | Sept. 3, 1935 |
| 2,284,515 | Criswell | May 26, 1942 |
| 2,513,514 | Poage | July 4, 1950 |

FOREIGN PATENTS

| | | |
|---|---|---|
| 420,155 | Great Britain | Nov. 19, 1934 |
| 651,893 | Great Britain | Apr. 11, 1951 |